US011610264B2

(12) United States Patent
Pearson et al.

(10) Patent No.: US 11,610,264 B2
(45) Date of Patent: *Mar. 21, 2023

(54) SYSTEM AND METHOD FOR BUY-SIDE ORDER MATCHING

(71) Applicant: FIDESSA TRADING UK LIMITED, London (GB)

(72) Inventors: Dave Pearson, Camberley (GB); Russell Thornton, London (GB); Paul Nokes, Camberley (GB)

(73) Assignee: FIDESSA TRADING UK LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,428

(22) Filed: May 27, 2020

(65) Prior Publication Data

US 2020/0286178 A1  Sep. 10, 2020

Related U.S. Application Data

(63) Continuation of application No. 15/888,603, filed on Feb. 5, 2018, now Pat. No. 10,699,338, which is a continuation of application No. 14/284,169, filed on May 21, 2014, now Pat. No. 9,922,373.

(Continued)

(51) Int. Cl.
*G06Q 40/00* (2012.01)
*G06Q 40/04* (2012.01)
*G06Q 50/18* (2012.01)

(52) U.S. Cl.
CPC ........... *G06Q 40/04* (2013.01); *G06Q 50/188* (2013.01)

(58) Field of Classification Search
CPC ...... G06Q 40/00; G06Q 10/087; G06Q 30/08; G06Q 40/06

See application file for complete search history.

(56) References Cited

U.S. PATENT DOCUMENTS

| | | | | |
|---|---|---|---|---|
| 5,924,082 | A * | 7/1999 | Silverman | G06Q 50/188 705/37 |
| 6,983,259 | B1 * | 1/2006 | Foray | G06Q 40/04 705/37 |
| 7,024,386 | B1 * | 4/2006 | Mills | G06Q 40/00 705/37 |

(Continued)

OTHER PUBLICATIONS

Bank for International Settlements (Recommendations for Central Counterparties [Bank for International Settlements, Committee on Payment and Settlement Systems], https://www.bis.org/cpmi/publ/d61.pdf, Mar. 2004) (Year: 2004).*

(Continued)

*Primary Examiner* — Mike Anderson
*Assistant Examiner* — Mark H Gaw
(74) *Attorney, Agent, or Firm* — Baker Botts L.L.P.

(57) ABSTRACT

Techniques for buy-side order matching in the trading of financial instruments using a centralized matching engine having one or more storage devices including rules and order parameters for a plurality of buy-side parties. The centralized matching engine includes one or more transmitters and receivers communicatively coupled to a network and one or more processors operatively coupled to the one or more storage devices and the one or more transmitters and receivers. At least one message sent over the network by a plurality of buy-side parties and is received by the central matching engine to set the rules or order parameters. At least one order of at least two of the plurality of buy-side parties is matched based on the rules and the order parameters. A message is transmitted over the network to a sell-side party indicating that trade negotiation can commence.

14 Claims, 9 Drawing Sheets

Related U.S. Application Data (60) Provisional application No. 61/825,754, filed on May 21, 2013.

(56) References Cited

U.S. PATENT DOCUMENTS

| | | | | |
|---|---|---|---|---|
| 7,908,199 | B2* | 3/2011 | Neff | G06Q 40/10 705/37 |
| 8,027,904 | B2* | 9/2011 | O'Callahan | G06Q 40/06 705/37 |
| 2009/0288012 | A1* | 11/2009 | Hertel | G06Q 20/105 715/769 |

OTHER PUBLICATIONS

U.S. Appl. No. 15/888,603 (U.S. Pat. No. 10,699,338), filed Feb. 5, 2018 (Jun. 30, 2020).
U.S. Appl. No. 14/284,169 (U.S. Pat. No. 9,922,373), filed May 21, 2014 (Mar. 20, 2018).
U.S. Appl. No. 15/888,603, filed May 27, 2020 Issue Fee Payment.
U.S. Appl. No. 15/888,603, filed Feb. 27, 2020 Notice of Allowance.
U.S. Appl. No. 14/284,169, filed Feb. 6, 2018 Issue Fee Payment.
U.S. Appl. No. 14/284,169, filed Nov. 8, 2017 Notice of Allowance.
U.S. Appl. No. 14/284,169, filed Jun. 14, 2017 Amendment and Request for Continued Examination (RCE).
U.S. Appl. No. 14/284,169, filed Mar. 22, 2017 Final Office Action.
U.S. Appl. No. 14/284,169, filed Jan. 13, 2017 Response to Non-Final Office Action.
U.S. Appl. No. 14/284,169, filed Oct. 20, 2016 Non-Final Office Action.
Bis, "New developments in clearing and settlement arrangements for OTC derivatives", Bank for International Settlements, https://www.bis.org/cpmi/publ/d77.pdf, Mar. 2007 (Year: 2007).

\* cited by examiner

Actionable Items

Matched Interests (please confirm)

- Buying FDSA — Fidessa Group PLC (LON:FDSA) — Please confirm you wish to proceed. — Time Left: 10 mins — ③
- Selling QPP — Quindell Portfolio PLC (LON:QPP) — Please confirm you wish to proceed. — Time Left: 13 mins
- Buying WEIR — Weir Group PLC (LON:WEIR) — Please confirm you wish to proceed. — Time Left: 14 mins

Awaiting Contra Confirmation

- Buying BBY — Balfour Beatty PLC(LON:BBY) — Nudge the other counter party to respond? — Time Left: 4 mins — ①

Negotiating

- Selling FEV — Fidelity European Values PLC(LON:FEV) — You should be negotiating with Citi Bank. Please confirm the outcome. — Time Left: 11 mins — ②
- Selling KLR — Keller Group PLC(LON:KLR) — You should be negotiating with Deutsche Bank. Please confirm the outcome. — Time Left: 14 mins

Traded

- Sold BP — BP PLC(LON:BP) — You traded this stock through JP Morgan — Traded at 09:12 — ①

| Actionable | Open | History | Settings |

Actionable Items

Matched Interests (please confirm) ②

- Selling QPP — Quindell Portfolio PLC (LON:QPP) — Please confirm you wish to proceed. — Time Left: 13 mins ⊚
- Buying WEIR — Weir Group PLC (LON:WEIR) — Please confirm you wish to proceed. — Time Left: 14 mins ⊚

Awaiting Contra Confirmation ②

- Buying BBY — Balfour Beatty PLC(LON:BBY) — Nudge the other counter party to respond? — Time Left: 4 mins ⊚
- Buying FDSA — Fidessa Group PLC (LON:FDSA) — Nudge the other counter party to respond? — Time Left: 10 mins ⊚

— 501

Negotiating ②

- Selling FEV — Fidelity European Values PLC(LON:FEV) — You should be negotiating with Citi Bank. Please confirm the outcome. — Time Left: 11 mins ⊚
- Selling KLR — Keller Group PLC(LON:KLR) — You should be negotiating with Deutsche Bank. Please confirm the outcome. — Time Left: 14 mins ⊚

Traded ①

- Sold BP — BP PLC(LON:BP) — You traded this stock through JP Morgan — Traded at 09:12 ⊚

| Actionable ⊚ | Open ⊙ | History ⊛ | Settings ⊚ |

FIG. 5C

Actionable Items

Matched Interests (please confirm) ②

- Selling QPP — Time Left: 13 mins
  Quindell Portfolio PLC (LON:QPP)
  Please confirm you wish to proceed.

- Buying WEIR — Time Left: 14 mins
  Weir Group PLC (LON:WEIR)
  Please confirm you wish to proceed.

Awaiting Contra Confirmation ①

- Buying BBY — Time Left: 4 mins
  Balfour Beatty PLC(LON:BBY)
  Nudge the other counter party to respond?

Negotiating ③

- Selling FEV — Time Left: 11 mins
  Fidelity European Values PLC(LON:FEV)
  You should be negotiating with Citi Bank. Please confirm the outcome.

- Selling KLR — Time Left: 14 mins
  Keller Group PLC(LON:KLR)
  You should be negotiating with Deutsche Bank. Please confirm the outcome.

- Buying FDSA — Time Left: 15 mins
  Fidessa Group PLC (LON:FDSA)
  You should be negotiating with UBS. Please confirm the outcome.

Traded ①

- Sold BP — Traded at 09:12
  BP PLC(LON:BP)
  You traded this stock through JP Morgan

| Actionable | Open | History | Settings |

Bought FDSA
Fidessa Group PLC (LON.FDSA)

Did you successfully trade this stock?

565 — ( No )

[ Reason text if not traded ]

Do you want to continue searching for further matches?

566 — ( No )

| Brokers: | Only This One | All | Not This One |
| Counterpartys: | Only This One | All | Not This One |

| Broker Rating | Good | Average | Bad |
| Counterparty Rating | Good | Average | Bad |

567

[ Enter ] [ Go Back ]

FIG. 5E

SYSTEM AND METHOD FOR BUY-SIDE ORDER MATCHING

CROSS-REFERENCE TO RELATED APPLICATIONS

This application is a continuation of U.S. patent application Ser. No. 15/888,603 filed Feb. 5, 2018 and entitled "SYSTEM AND METHOD FOR BUY-SIDE ORDER MATCHING," which is a continuation of U.S. patent application Ser. No. 14/284,169, now U.S. Pat. No. 9,922,373, filed May 21, 2014 and entitled "SYSTEM AND METHOD FOR BUY-SIDE ORDER MATCHING," which is related to U.S. Provisional Application Ser. No. 61/825,754, filed May 21, 2013, each of which is incorporated herein by reference in their entirety and from which priority is claimed.

BACKGROUND

The disclosed subject matter relates to techniques for the matching of orders in connection with the trading of financial instruments.

In the trading of financial instruments, including, e.g., equities, bonds, options, futures, derivatives, or the like, parties may desire to trade large blocks of an instrument. Conventional market structures can make it difficult for a buy-side party (e.g., an investment manager) to trade a relatively large block of an instrument without providing details, such as the available size or price of an instrument, to other firms. For example, if a buy-side party wishes to execute a trade of a relatively large block of an instrument, the buy-side party could communicate its trading intention, e.g., with an indication of interest ("IOI") messaging system, to a sell-side party without a guarantee that a trade would actually be executed. This provision of details to other firms, e.g., sell-side parties, can lead to information leakage, which can have market impact that may have a detrimental effect on the trading price of the financial instrument.

Conventionally, a sell-side party acts as an intermediary between two potential buy-side counterparties and facilitates the determination of an appropriate size (i.e., the number of shares) and price of a trade between the counterparties. The sell-side party can receive IOI messages from potential buy-side parties, and can balance potential buy-side parties' trade interests. When two parties have trade interests that generally align (i.e., one party wishes to sell a financial instrument and another party wishes to buy that financial instrument), the sell-side party can facilitate the discovery of appropriate trade size and price. This conventional process, however, requires that buy-side parties disclose information about their trading intentions, demand, price limits, block size, and the like. This information can impact the market for a financial instrument. For example, a buy-side party's intention to buy a large block of a financial instrument may signal an increased demand for that instrument, which may increase the price at which others are willing to sell the financial instrument. Similarly, leakage of information about a seller's intent to sell a large block of a given instrument could decrease the price that others would be willing to pay, thereby driving down the price before the full block has traded.

Accordingly, it is desirable to provide a method and system for matching orders with reduced opportunity for the dissemination of related to buy-side parties' trade intentions.

SUMMARY

The presently disclosed subject matter provides techniques for buy-side order matching, and more particularly to techniques for buy-side order matching without sell-side involvement in discovering a counterparty for an order.

In one aspect of the disclosed subject matter, a system for buy-side order matching in the trading of financial instruments using a centralized matching engine includes one or more storage devices having stored therein one or more rules and one or more order parameters for a plurality of buy-side parties, one or more transmitters and receivers communicatively coupled to a network, and one or more processors operatively coupled to the one or more storage devices and the one or more transmitters and receivers. The one or more processors are configured to receive at least one message sent over the network by a plurality of buy-side parties to set the one or more rules or the one or more order parameters. The one or more processors are configured to match at least one order of at least two of the plurality of buy-side parties based on the rules and the one or more order parameters. The one or more processors are configured to transmit a message over the network to a sell-side party indicating that trade negotiation can commence.

In certain embodiments, the order parameters can include one or more of an instrument symbol, an order size, and an order direction for each trade interest placed by the plurality of buy-side parties. The one or more rules can include, for the plurality of buy-side parties, an indication of which other buy-side parties, if any, to avoid matching with. Additionally or alternatively, the one or more rules can include, for the plurality of buy-side parties, an indication of sell-side parties that each buy-side party is willing to engage with for subsequent trade negotiation.

In certain embodiments, the one or more processors can be configured to match the orders of at least two of the plurality of buy-side parties when the order parameters for a first party and the order parameters for a second party include the same instrument symbol and the opposite order direction, when the one or more rules for the first party does not include an indication to avoid matching with the second party, when the one or more rules for the second party does not include an indication to avoid matching with the first party, and when the one or more rules for the first and second party include a mutual sell-side party. After the matching of orders from the at least two buy-side parties, the central matching engine can communicate via the network with each of the at least two buy-side parties to confirm interest. The message to the sell-side party can include instrument details and names of the at least two buy-side parties.

In another aspect of the disclosed subject matter, a method for buy-side order matching in the trading of financial instruments including using a centralized matching engine including one or more storage devices having stored therein one or more rules and one or more order parameters for a plurality of buy-side parties, one or more transmitters and receivers communicatively coupled to a network, and one or more processors operatively coupled to the one or more storage devices and the one or more transmitters and receivers. The method includes receiving at least one message sent over the network by a plurality of buy-side parties to set the one or more rules and the one or more order parameters. The method includes matching at least one order of at least two of the plurality of buy-side parties based on the one or more rules or the one or more order parameters. The method includes transmitting a message over the network to a sell-side party indicating that trade negotiation can commence.

In certain embodiments, the one or more order parameters can include one or more of an instrument symbol, an order size, and an order direction for each trade interest placed by the plurality of buy-side parties. The one or more rules can include, for the plurality of buy-side parties, an indication of which other buy-side parties, if any, to avoid matching with. Additionally or alternatively, the one or more rules can include, for the plurality of buy-side parties, an indication of sell-side parties that each buy-side party is willing to engage with for subsequent trade negotiation.

In certain embodiment, matching the orders of at least two of the plurality of buy-side parties can include identifying a match when the one or more order parameters for a first party and the one or more order parameters for a second party include the same instrument symbol and the opposite order direction, when the one or more rules for the first party does not include an indication to avoid matching with the second party, when the one or more rules for the second party does not include an indication to avoid matching with the first party, and when the one or more rules for the first and second party include a mutual sell-side party. The method can further include, after the matching of orders from the at least two buy-side parties, communicating via the network with each of the at least two buy-side parties to confirm interest. Transmitting the message to the sell-side party can include transmitting a message including instrument details and names of the at least two buy-side parties.

Throughout the drawings, the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

Exemplary embodiments of the disclosed subject matter are described below, with reference to the figures, for purposes of illustration, and not limitation.

The disclosed subject matter provides techniques for buy-side order matching without sell-side involvement in discovering a counterparty for an order. Generally, for purpose of illustration and as disclosed in more detail below, buy-side parties can indicate, to a centralized matching engine, intent in trading a financial instrument. The centralized matching engine can identify a match between two buy-side parties if certain criteria are met. If both counter-parties approve the match, a sell-side party can be notified that a trade negotiation can commence, and is notified with the instrument detail and the names of the buy-side parties that have matched. In accordance with the disclosed subject matter, the sell-side party need not be involved in the process of discovering a counterparty for an order, thus reducing leakage of information regarding buy-side parties' trading intentions. That is, the buy-side parties' trading intentions are not disclosed to the sell-side party until a match has been found.

In one aspect of the disclosed subject matter, techniques for buy-side order matching include a centralized matching engine associated with one or more storage devices having stored therein a series of standard rules and order parameters. The centralized matching engine is configured to communicate with a plurality of buy-side parties to set the series of standard rules and order parameters. The centralized matching engine is further configured to match orders from at least two of the plurality of buy-side parties based on the series of standard rules and order parameters, and communicate with a sell-side party to notify the sell-side party that trade negotiation can commence. For purpose of clarity, and not limitation, exemplary embodiments of the systems and methods of this aspect of the disclosed subject matter will be described concurrently with reference to FIGS. 1-4.

Figure 1:
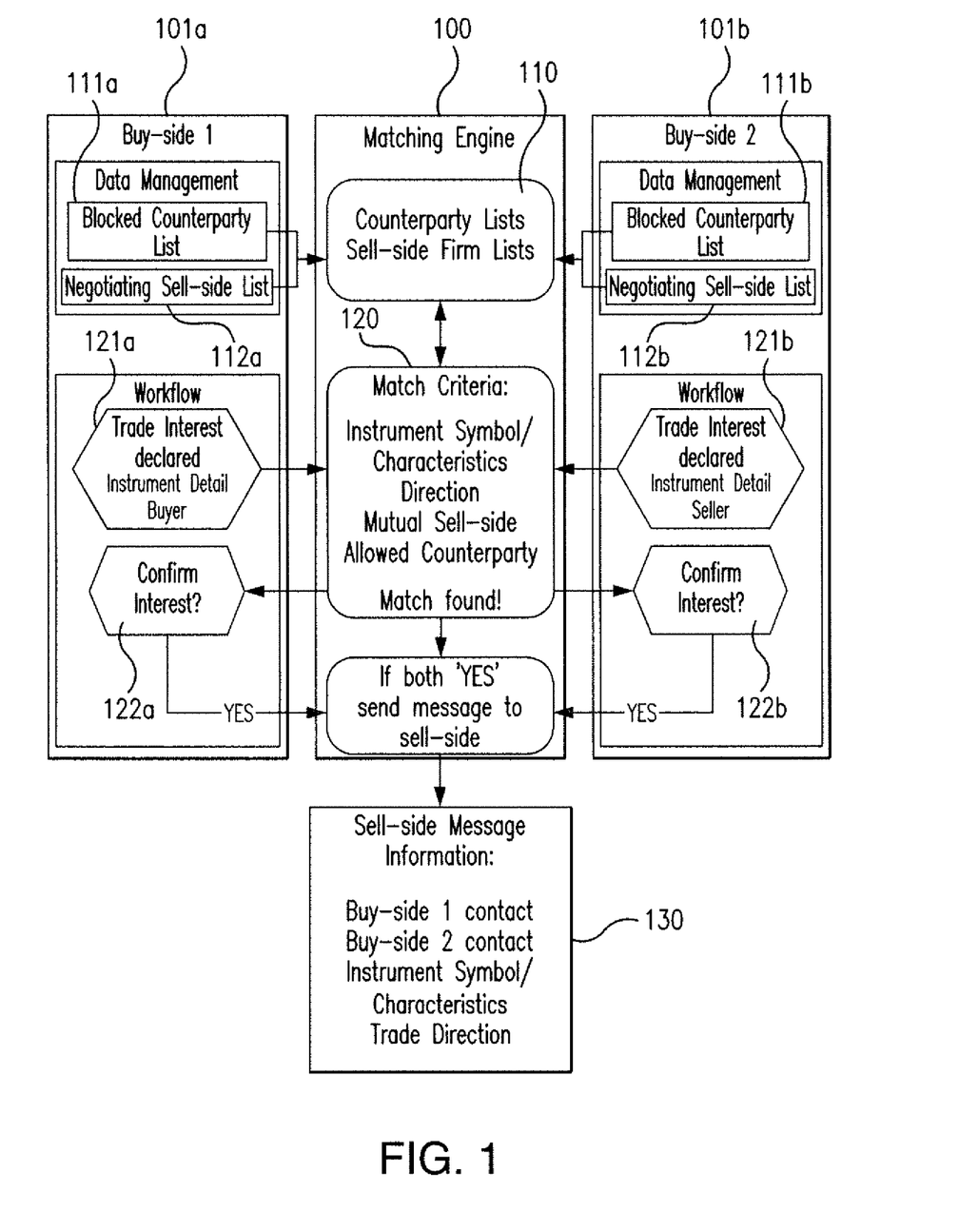
FIG. 1 illustrates a workflow diagram in accordance with an exemplary embodiment of the disclosed subject matter.

In one exemplary and non-limiting embodiment, with reference to FIG. 1, techniques for buy-side order matching can include a centralized matching engine 100 associated with one or more storage devices (e.g., including databases 110 and 120) having stored therein information, including, for example, a series of standard rules and order parameters. The centralized matching engine 100 can include, for example, one or more servers connected to a network, such as the Internet or an intranet, and which can include one or more computer processors and memories. Alternatively, the centralized matching engine 100 can include a standalone computer, a server cluster, a distributed computing system, a cloud-based computing system, a mobile computing system, or the like. The memories associated with the centralized matching engine 100 can store executable instructions which, when executed by a processor, can implement the techniques disclosed herein. As embodied herein, the memories can include non-transitory computer readable storage media, including, without limitation, random access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), a CD-ROM, DVD, Magnetic disk, or the like, as local storage, networked storage, cloud-based storage, or otherwise configured storage. Moreover, as used herein, the term "memory" or "memories" can also include one or more databases.

The one or more storage devices associated with the centralized matching engine 100 can include, for example, one or more databases (e.g., databases 110 and 120). The database can be stored, for example, in the one or more memories of the centralized matching engine 100 or in one or more other computer readable media storage devices, such as magnetic or optical disks. In an exemplary embodiment, for purpose of illustration and not limitation, a database 110 can store a set of standard rules for the buy-side parties. For example, database 110 can store, for a buy-side party 101a a list of blocked counterparties 111a (i.e., a list of other buy-side parties with which buy-side party 101a does not wish to trade with). Database 110 can also store, for buy-side party 101a, a list of sell-side parties 112a with which the buy-side party 101a approves for negotiation of a matched order. The database 110 can likewise store a list of blocked counterparties 110b and list of sell-side parties 112b for buy-side party 101b.

The databases can also store order parameters for the buy-side parties. For example, and not limitation, database 120 can store order parameters including information about buy-side party 101a's declared trade interests 121a as well as buy-side party 101b's declared trade interests 121b. Although FIG. 1 depicts database 110 and 120 as separate entities, it will be appreciated that the buy-side parties' rules and order parameters can be stored in a single database, multiple databases, federated databases, or other suitable arrangements.

The centralized matching engine 100 can be configured to communicate with a plurality of buy-side parties (e.g., 101a and 101b) to set the standard rules (e.g., 111a, 112a, 111b, 112b) and order parameters (e.g., 121a, 121b) stored in the one or more storage devices. For example, in an exemplary embodiment, the centralized matching engine 100 can further include one or more modems, routers, access points, switches, other wireless or wired network connections, or the like. In an exemplary embodiment, the centralized matching engine 100 can include a dedicated high speed connection, such as a T1 or T3 line, or some other type of fiber-optic connection, through a service provider. The centralized matching engine 100 can communicate with the plurality of buy-side parties in accordance with a known protocol, such as Financial Information eXchange ("FIX"), the ISO 15000 series of specifications, Swift, or any other suitable message format.

The series of order parameters (121a, 121b) can include, for example, a trade interest placed by one or more of the buy side parties. As used herein the term "trade interest" refers to an expression showing a condition, non-binding interest in buying or selling a financial instrument. For example, a first buy-side party 101a (the "buying counterparty") can communicate with the centralized matching engine 100 to select an instrument symbol corresponding to a financial instrument the buying counterparty wishes to buy. Alternatively, the buying counterparty 101a can set instrument characteristics indicative of the financial instrument the buying counterparty wishes to buy. The buy-side counterparty 101a can also set the size (e.g., number of shares) of the instrument desired and an indication that the direction of the trade is "buy." At least a second buy-side party 101b (the "selling counterparty") can communicate with the centralized matching engine 100 to likewise select an instrument symbol, instrument characteristics, size, and direction of the trade the selling counterparty wishes to sell.

Figure 2:
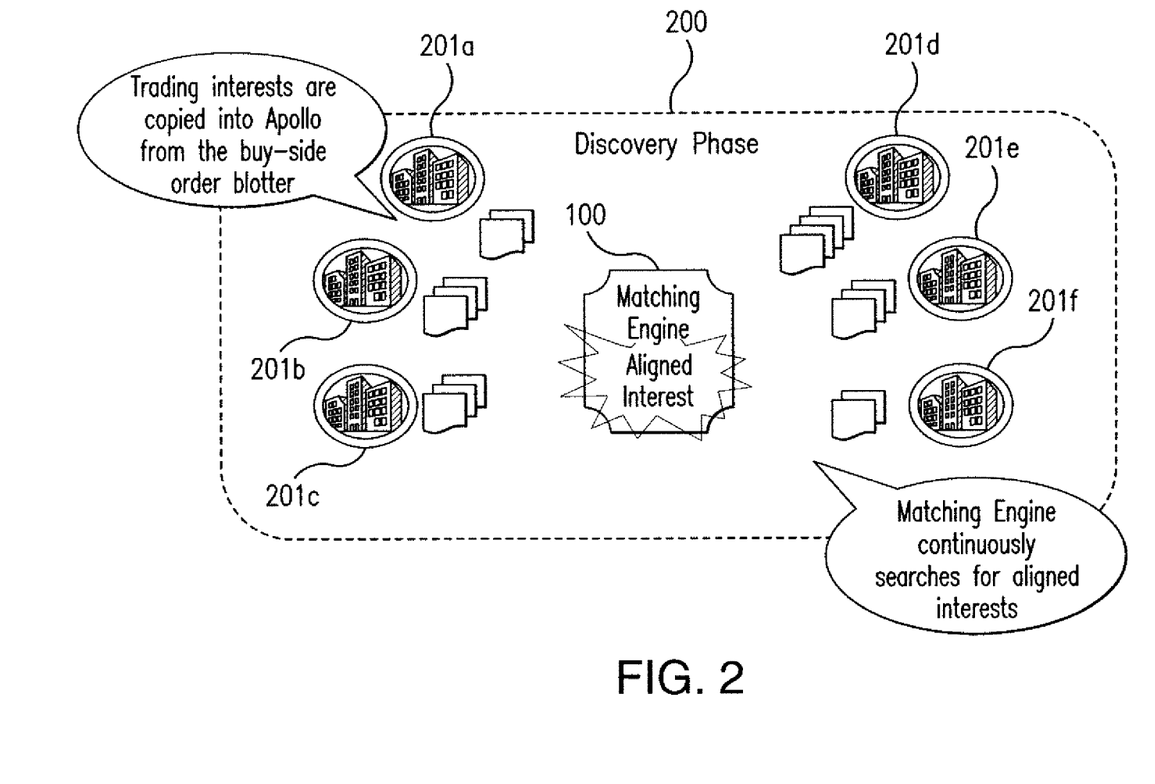
FIG. 2 illustrates the discovery phase of buy-side order matching in accordance with an exemplary embodiment of the disclosed subject matter.

In an exemplary and non-limiting embodiment, with reference to FIG. 2, the central matching engine 100 can communicate with a plurality of buy-side parties (201a, 201b, 201c, 201d, 201e, 201f [collectively, 201]). Each buy-side party in communication with the central matching 100 engine can independently transmit messages to the central matching engine 100 indicating that party's trade interests. For example, employees of the buy side parties 201 may enter the details of one or more orders they wish to submit into an order management system. The order management system can be configured to generate messages including the details of the orders and route the messages to the central matching engine 100. Additionally and/or alternatively, the details of orders may be generated by computer software instead of entered by an employee. The transmitted order details can then be stored in the central matching engine 100 (e.g., in database 120).

As embodied herein, the buy-side parties 201 may each transmit a plurality of trade interests, and the central matching engine 100 can store a plurality of trade interests for each party. In certain embodiments, the buy-side parties 201 can communicate with the central matching engine 100 to requests, modify, or cancel pending trade interests. For example, the central matching engine 100 can be configured to query the one or more storage devices for stored order parameters for a particular buy-side party upon request. Similarly, the central matching engine 100 can be configured to remove or alter one or more order parameters for a buy-side party upon request. In an exemplary embodiment, communication between the buy-side parties 201 and central matching engine 100 for the purpose of requesting, modifying, or canceling pending trade interests can include the transmission of messages between the parties 201 and central matching engine 100 in accordance with the FIX protocol. One of skill in the art will appreciate, however, that messages can be transmitted in accordance with a variety of other suitable protocols.

The buy-side parties can likewise communicate with the central matching engine 101 to set the standard rules (e.g., 111a, 112a, 111b, 112b). The series of standard rules can include, for example, an indication for each buy-side party of which other buy-side parties, if any, each buy-side party does not want to be matched against for any trade interests. Additionally, the series of standard rules can include an indication of a list of sell-side parties that each buy-side party is willing to use for subsequent negotiation. In accordance with an exemplary embodiment, for purpose of illustration, the available rules for each buy-side party can include.

The centralized matching engine 100 is configured to match orders from at least two of a plurality of buy-side parties based on the series of standard rules and order parameters stored in the database (e.g., database 110 and/or 120), and communicate with a sell-side party 130 to notify the sell-side party that trade negotiation can commence. For example, in accordance with an exemplary embodiment, the centralized matching engine 100 can be configured to match the buying counterparty with the selling counterparty if (1) one or more appropriate instruments can be traded, (2) the trade direction is opposite, (3) each counterparty has not indicated that they do not wish to trade with the other, (4) there is a mutual sell-side party shared by both counterparties that will take on the trade negotiation once the matching engine has found a match. In accordance with an exemplary embodiment, the matching process can be performed by the central matching engine 100 in real-time, continuously, throughout the trading day. In this embodiment, matches can be identified on a time-priority basis, such that the highest priority match will be processed at any point in time.

Figure 3:
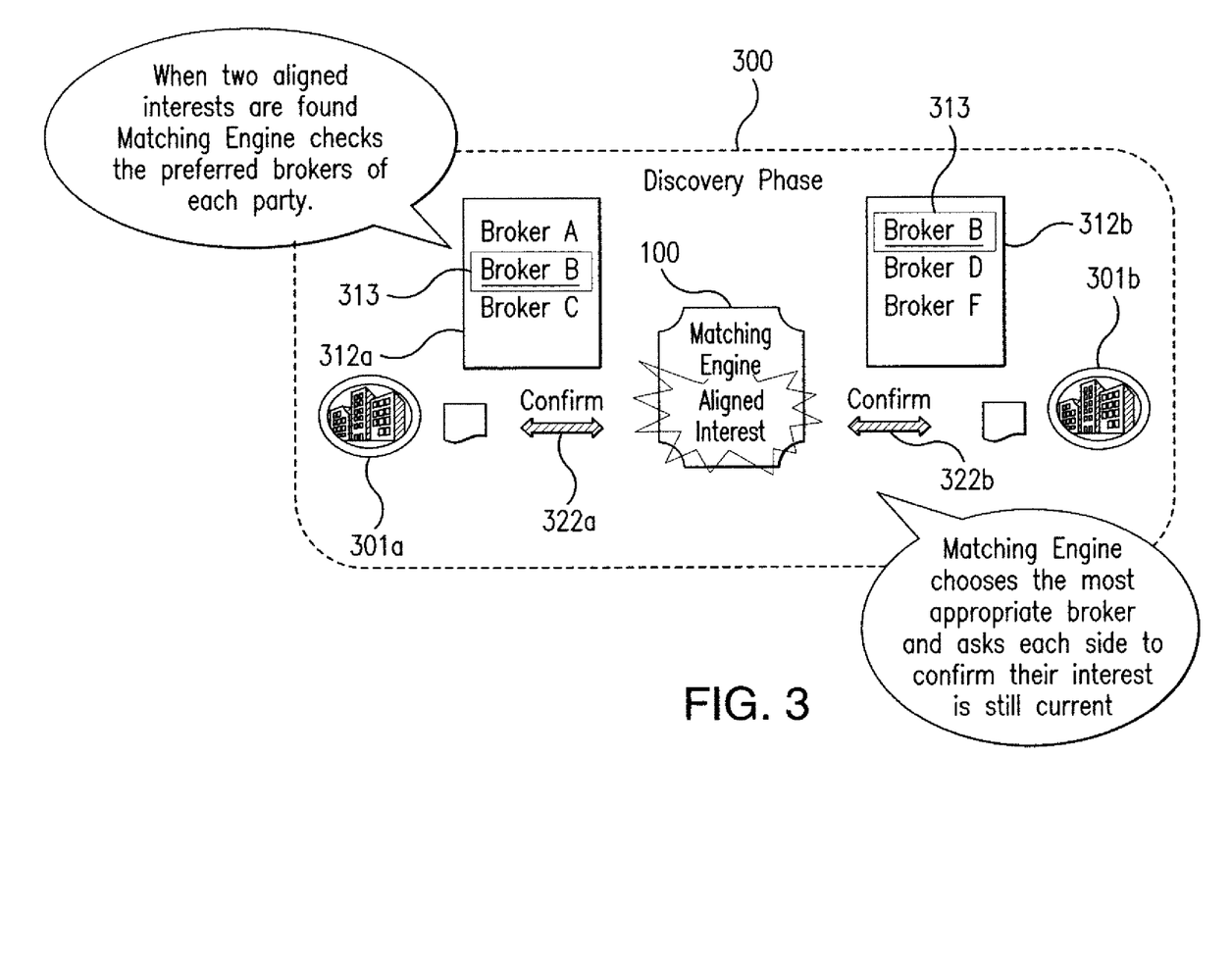
FIG. 3 illustrates the discovery phase of buy-side order matching where two buy-side parties have an aligned trade interest.

The process of entry of order parameters and standard rules and the identification of matching orders, as described herein, can be referred to as the "discovery phase." FIG. 2 illustrates the operation of the central matching engine 100 during the discovery phase, and in particular FIG. 2 illustrates the entry of order parameters from buy-side parties 201. FIG. 3 depicts the operation of the central matching engine 100 discovery phase after a match has been found between buy-side party 301a and buy-side party 301b. When the central matching engine 100 identifies a match (i.e., when the central matching engine 100 determines that two buy-side parties trade interests are aligned based on the matching rules described herein), the central matching engine 100 can check its storage devices (e.g., database 110 and/or 120) for a list of the preferred brokers corresponding to each party to choose an appropriate broker for negotiation. For example, with reference to FIG. 3, buy-side party 301a has submitted a set of rules including negotiating sell-side list 312a that indicates a preference for negotiation with Broker A, Broker B (313) and Broker C, respectively. Buy-side party 301b has submitted a set of rules including negotiating sell-side list 312b indicating a preference for negotiating with Broker B (313), Broker D, and Broker F, respectively. The central matching engine 100 can select a sell-side party for negotiation between buy-side party 301a and 301b by identifying a sell-side party common to both lists (e.g., Broker B, 313). Additionally, in certain embodiments, if the buy-side parties' sell-side lists include multiple common sell-side parties, the central matching engine 100 can choose a sell-side party based on the parties' preferences. Additionally and/or alternatively, in certain embodiments, the central matching engine 100 can communicate with each buy-side party to determine the parties respective sell-side preferences. For example, the central matching engine 100 can transmit a list of mutual sell-side parties to each buy-side counterparty, and each buy-side counterparty can rank the mutual sell-side parties based on preference, for example using a user interface such as that illustrated in FIG. 5b.

After a match has been found and an appropriate sell-side party has been identified, the centralized matching engine 100 can communicate with each counterparty (101a, 101b) to confirm each parties' interest. For example, with reference to FIG. 1 and without limitation, the centralized matching engine 100 can send a message to a buying counterparty 101a with an indication that a match has been found. In certain embodiments, this message can include details about the match including the identity of the matched counterparty, the instrument symbol and/or characteristics, and the like. One of skill in the art will appreciate, however, that the information provided to the buy-side parties after a match has been found need not include such information. For example, it may be desirable to prevent the sending of this information to buy-side counterparties to further reduce information leakage. The buying counterparty 101a can confirm its trade interest by responding to the centralized matching engine 100 with an acknowledgement message.

The selling counterparty 101b can likewise confirm its trade interest by responding with an acknowledgment message. FIG. 3 likewise depicts an example of a confirmation process. That is, after the matching engine 100 has identified a match (i.e., that buy-side parties 301a and 301b's trade interests are aligned) and identified an appropriate sell-side party (e.g., Broker B 313), each buy-side party 301a and 301b can confirm their trade interest. For example, buy-side party 301a can send a confirmation message 322a to the central matching engine 100 that its trade interest is current. Likewise, buy-side party 301b can send a confirmation message 322b to the central matching engine 100 that its trade interest is still current. It will be appreciated that, in some instances, a buy-side party's trade interest may no longer be current. Accordingly, in certain embodiments, the central matching engine 100 can await confirmation that a matched trade interest is still current from both buy-side parties to a match before divulging any details about the buy-side parties to their respective counterparties. In this manner, leakage of information about the buy-side parties' positions can be reduced.

In accordance with an exemplary embodiment of the disclosed subject matter, if a buy-side party's trade interest is no longer current, the buy-side party can provide the central-matching engine 100 with a reason for withdrawal of a trade interest. For example, a buy-side party may indicate that they have already executed the trade interest, that they are no longer interest, or provide another reason for withdrawal using an exemplary user interface such as that depicted in FIG. 5b. The user can click the "Withdraw" button 557, which can transmit a message to the central matching engine 100 indicating that the trade interest in not confirmed and provide a reason for withdrawal.

If both buy-side parties confirm their trade interest, a message can be sent to a mutual sell-side party to notify the sell-side party that a trade negotiation can commence. For example, and with reference to FIG. 1, a message can be sent to a mutual sell-side party 130 (i.e., a sell-side party that appears in both buy-side parties' sell-side party lists 112a, 112b). The mutual sell-side party 130 can be selected in accordance with the series of rules stored in database 110 corresponding to each counterparty as described herein. The message to the sell-side party 130 can further include the instrument detail, and the names of the buy-side parties that have been matched.

Figure 4:
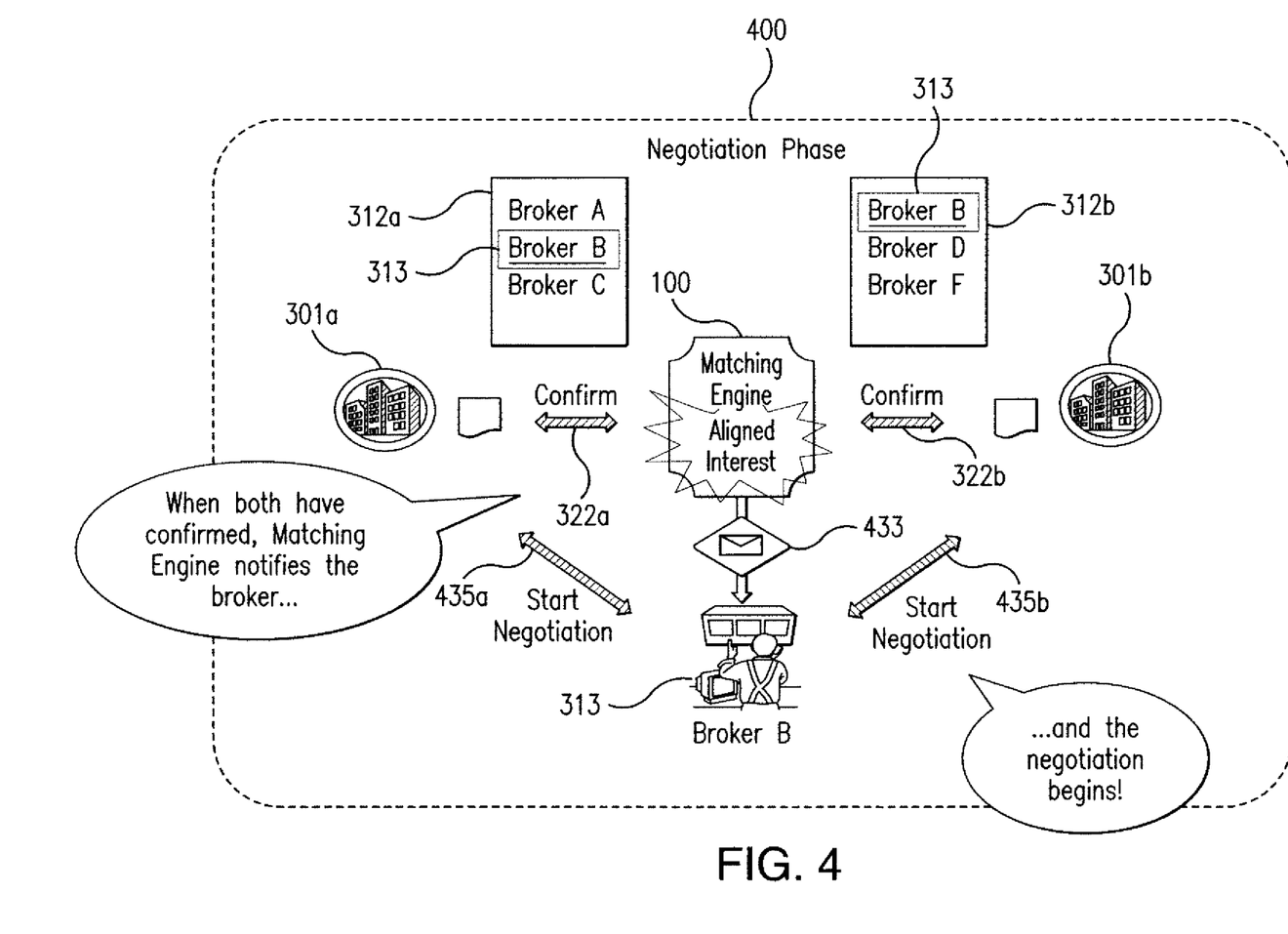
FIG. 4 illustrates the negotiation phase of the two buy-side parties of FIG. 3.

FIG. 4 illustrates the negotiation phase, in accordance with an exemplary and non-limiting embodiment, for matched trade interests of buy-side party 301a and buy-side party 301b as depicted in FIG. 3. In this example, Broker B 313 has been identified as an appropriate sell-side party, buy-side party 301a has confirmed its trade interest via message 322a, and buy-side party 301b has confirmed its trade interest via message 322b. Upon receipt of both confirmation messages 322a and 322b, the central matching engine 100 can notify Broker B 313 of the match and provide Broker B 313 with instrument detail and the names of the buy-side parties 301a and 301b. For example, central matching engine 100 can transmit a message 433 to Broker B 313 indicating the negotiation process can commence. Broker B 313 can act as an intermediary, and can start negotiation 435a with buy-side party 301a and can start negotiation 435b with buy-side party 301b. The techniques disclosed herein can thus allow buy-side firms to find a counterparty for a trade with another buy-side firm without having to reveal the size or price of the trade to a sell-side party or involve a sell-side party in the initial process of discovery of a counterparty.

Figure 5A:
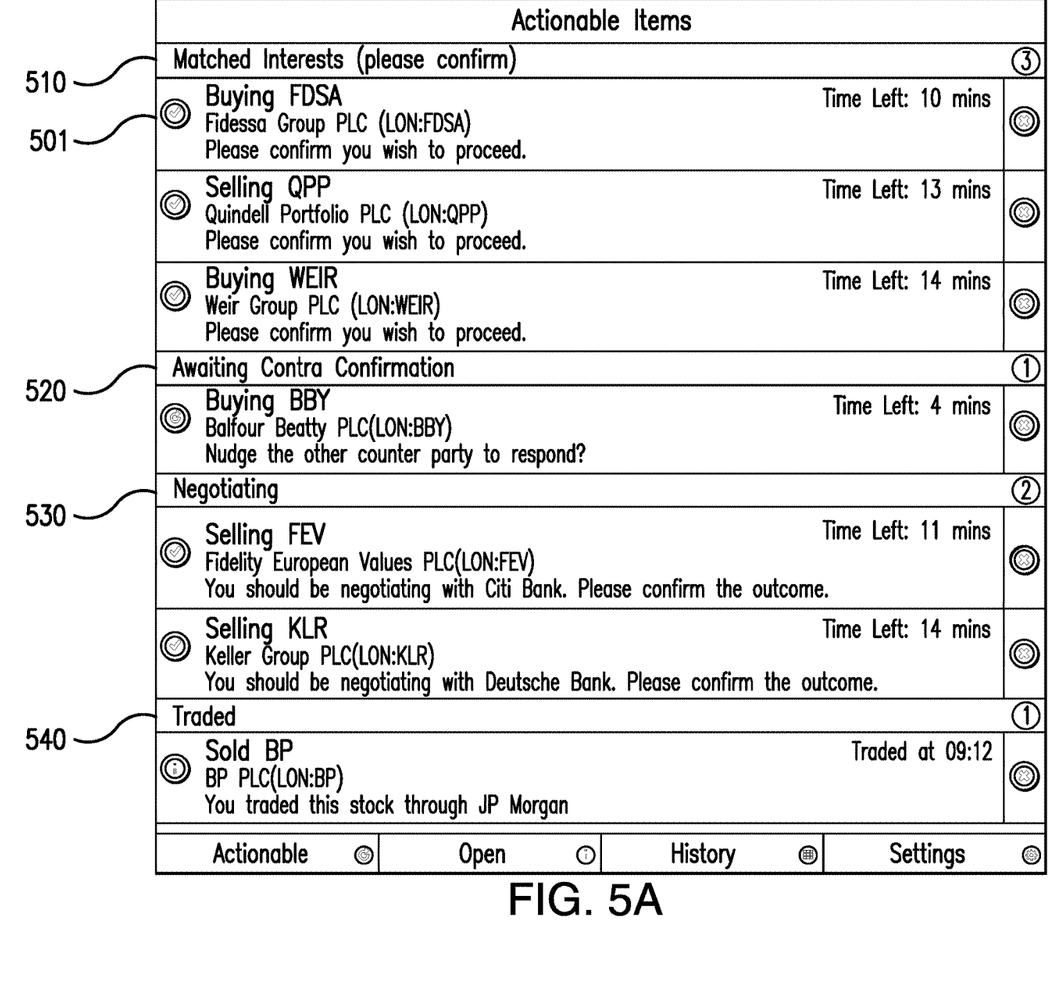
FIG. 5a is a screen shot of an exemplary user interface for a buy-side party to communicate with a central matching engine in accordance with the disclosed subject matter.

For purpose of illustration, and not limitation, a series of exemplary screen shots depicting the discovery and negotiation phase of buy-side order matching in accordance with the disclosed subject matter are provided in FIGS. 5a-e. FIG. 5a depicts a screen shot of a user interface for use by a buy-side party to interact with central matching engine 100. The user interface of FIG. 5a can be adapted display a plurality of trade interests corresponding to the buy-side party in various stages of matching. For example, the user interface may include a section for the display matched interests 510 (i.e., trade interests for which the central matching engine has identified a match that has not yet been confirmed by the user), a section for the display of confirmed trade interests 520 (i.e., trade interests that have been confirmed by the user but not the counterparty), a section for the display of trade interests in negotiation 530, and a section for the display of negotiated and executed trades 540.

The screenshot of FIG. 5a depicts a matched trade interest 501 for the order of a financial instrument with the symbol FDSA and an order direction of "buy." In this screen shot, for purpose of illustration, trade interest 501 appears in the "Matched Interests" section 510 because it has not yet been confirmed. The user interface can be adapted to display additional details of the trade interest, for example the name of the financial instrument, the exchange on which it is traded, or the like. The screen shot of FIG. 5a also displays an indication that the user must confirm the trade interest before proceeding. The user interface may be adapted to receive input from the user, such as in the form of a mouse click, to display another user interface for order confirmation.

Figure 5B:
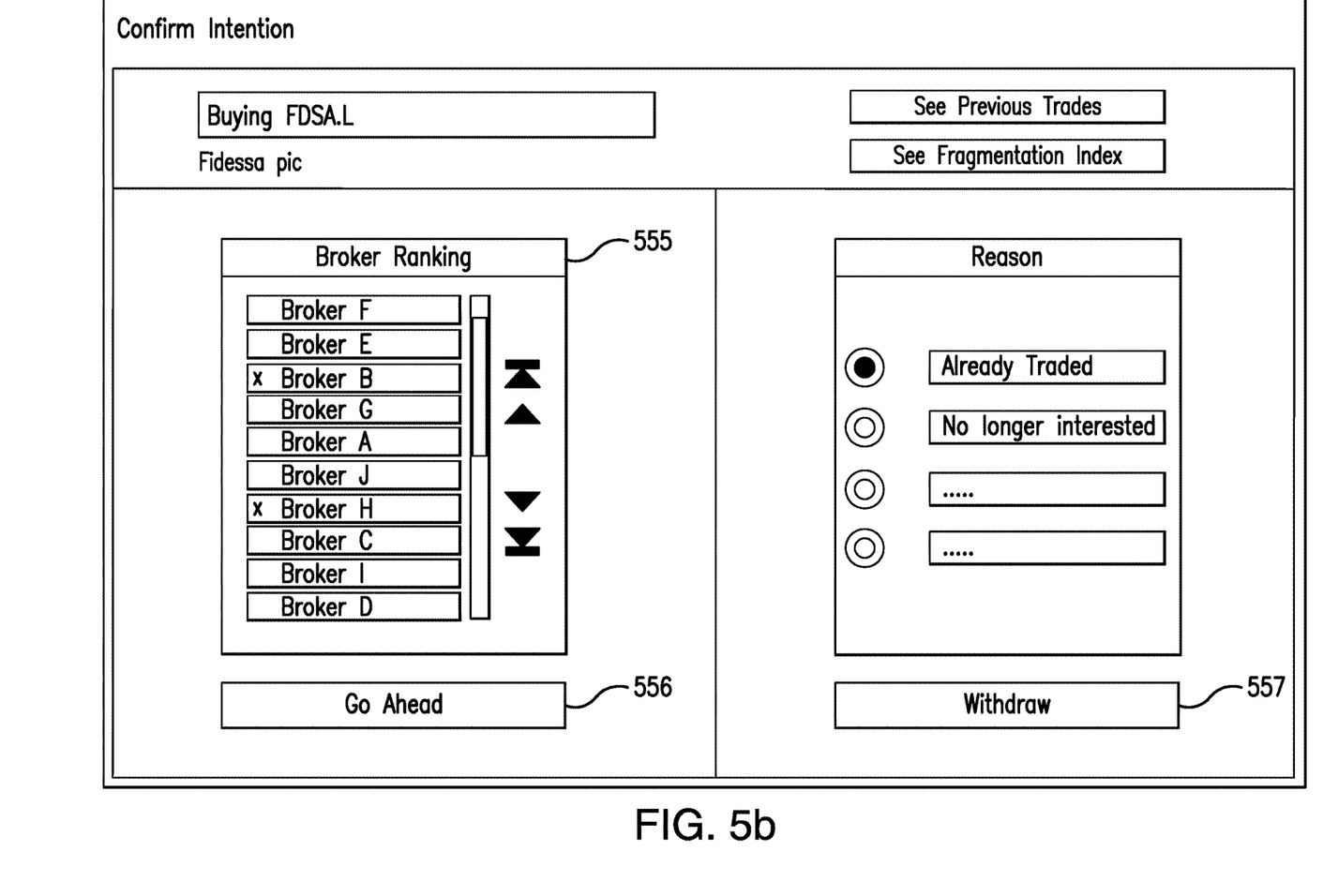
FIG. 5b is a screen shot an exemplary user interface for confirmation by a buy-side party of a trade interest in accordance with the disclosed subject matter.

FIG. 5b depicts a screen shot of an exemplary user interface for confirmation of trade interest of 501 for the purchase of FDSA. As described previously herein, the confirmation interface may include an interface element 555 for sell-side party ranking. The user may confirm the trade interest by clicking the "Go Ahead" button 556. Alternatively, the user may withdraw the trade interest by clicking the "Withdraw" button 557, and may provide a reason for withdrawal as described previously herein.

Figure 5C:
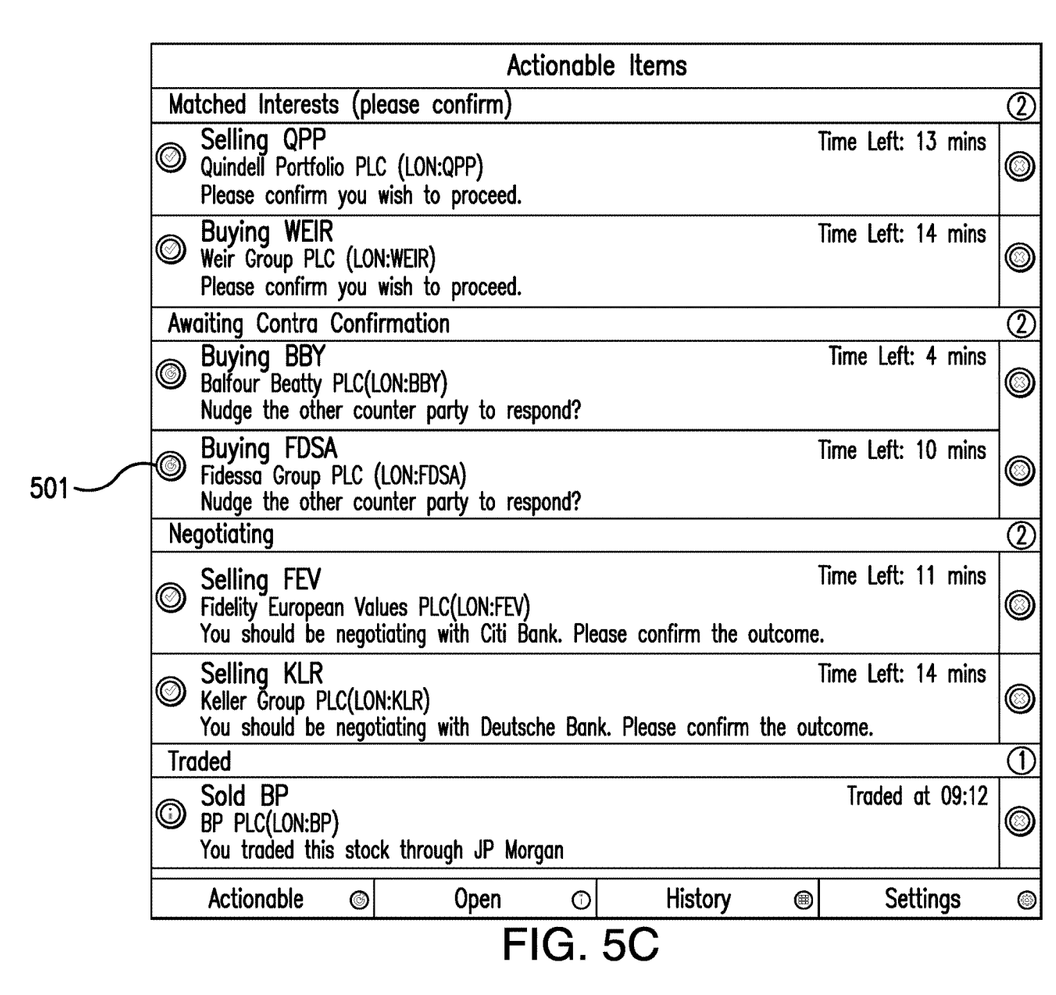
FIG. 5c is another screen shot of the exemplary user interface of FIG. 5a illustrating confirmation by the user of one of the trade interests.
Figure 5D:
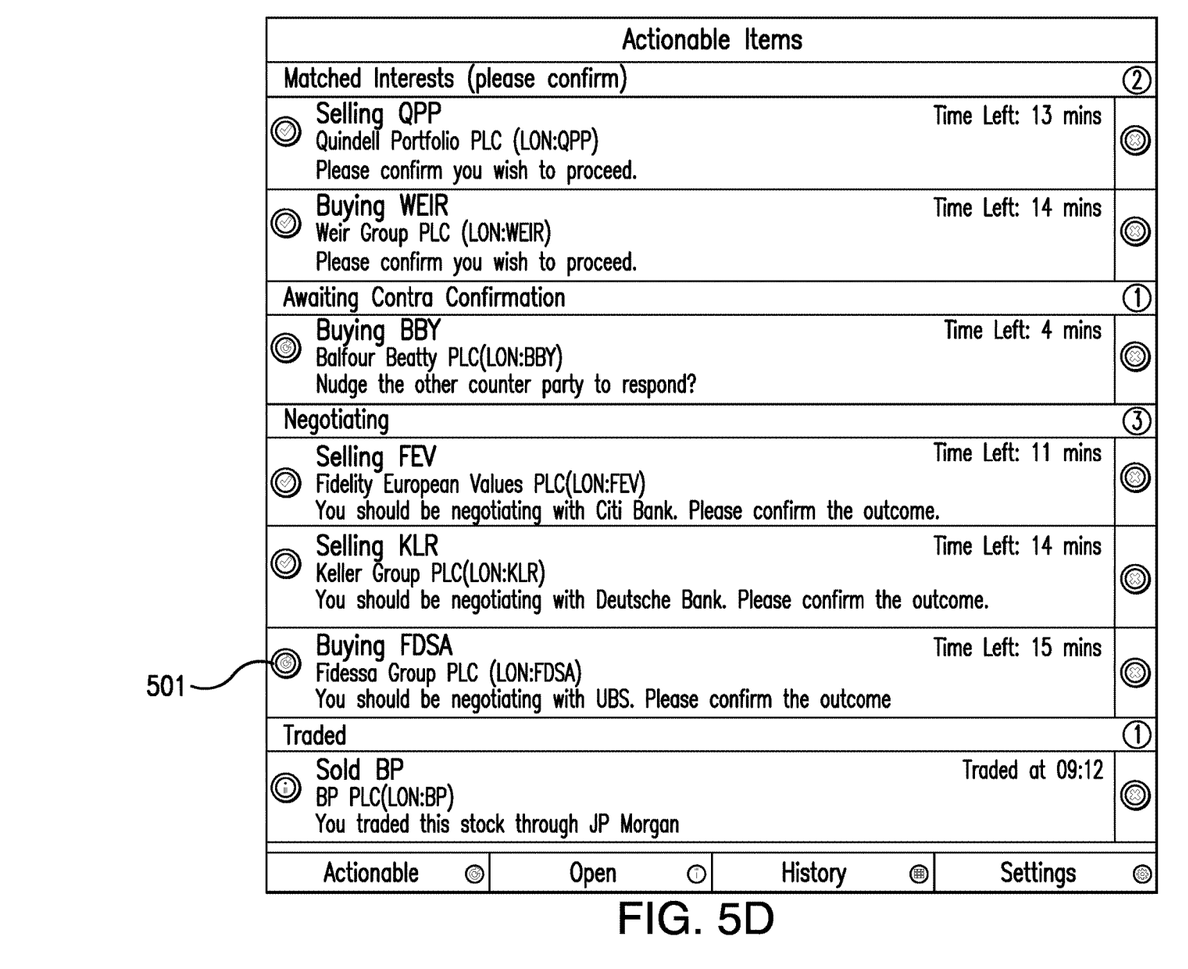
FIG. 5d is another screen shot of the exemplary user interface of FIG. 5a illustrating confirmation by both buy-side parties of one of the trade interests.

If the user confirms the trade interest by clicking the "Go Ahead" button 556, the user interface of FIG. 5a can be updated to display trade interest 501 under the "Awaiting Contra Confirmation" section 520 as illustrated by the exemplary screen shot of FIG. 5c. After the buy-side counterparty confirms their trade interest, the trade interest can be submitted to an appropriate sell-side party for negotiation as described herein. At this point, trade interest 501 can be displayed under the "Negotiating" section 530 as illustrated in FIG. 5d.

Figure 5E:
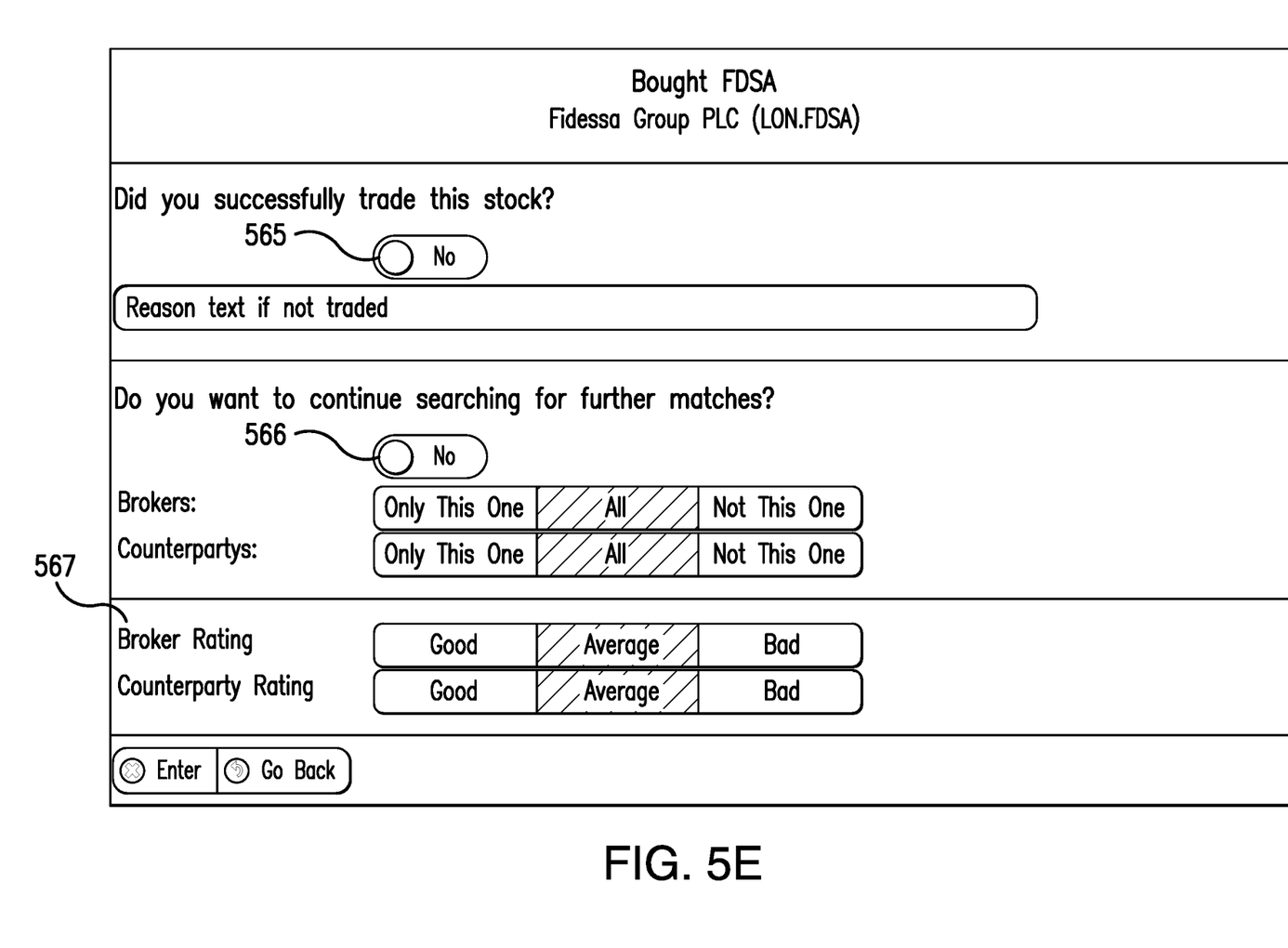
FIG. 5e is a screen shot of an exemplary user interface for a buy-side party after one of the trade interests has been submitted for negotiation.

After negotiation has terminated, either successfully or unsuccessfully, the user can enter details about the negotiation using an interface such as depicted in FIG. 5e. The interface of FIG. 5e allows the user to indicate whether the negotiation was successful (i.e., that the financial instrument was traded) or unsuccessful using interface element 565. If negotiation was unsuccessful, the user may instruct the central matching engine 101 to continue to search for further matches using interface element 566. Additionally, the user can set or modify the standard rules by which the central matching engine will use for subsequent matches. For example, the user may alter their counterparty and sell-side lists using the interface of FIG. 5e. The user may additionally rate the broker and counterparty used for negotiation of trade interest 501 using interface element 567. If the user indicates that negotiation was successful, the user interface of FIG. 5a may be adapted to display trade interest 501 under the "Traded" 540 section.

As described above in connection with certain embodiments, certain components, e.g., the centralized matching engine 100, can include a computer or computers, processor, network, mobile device, cluster, or other hardware to perform various functions. Moreover, certain elements of the disclosed subject matter can be embodied in computer readable code which can be stored on computer readable media and which when executed can cause a processor to perform certain functions described herein. In these embodiments, the computer and/or other hardware play a significant role in permitting the system and method for buy-side order matching. For example, the presence of the computers, processors, memory, storage, and networking hardware provides the ability to match buy-side orders in a more efficient manner. Moreover, the matching of electronic buy-side orders cannot be accomplished with pen or paper, as such information is received over a network in electronic form.

Additionally, as described above in connection with certain embodiments, certain components can communicate with certain other components, for example via a network, e.g., the Internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A system for order matching in the trading of financial instruments, comprising:
a centralized matching engine having one or more transmitters and receivers, wherein the centralized matching engine is communicatively coupled to a network, the network including one or more first computer systems and at least one second computer system, wherein the one or more first computer systems are configured to communicate between one or more first parties and the centralized matching engine, and wherein the at least one second computer system is configured to communicate between a second party and the centralized matching engine;
the centralized matching engine further having one or more processors operatively coupled to one or more storage devices and the one or more transmitters and receivers, the one or more processors configured to:
receive at least one message sent over the network from any of the one or more first computer systems, wherein the at least one message is stored in one or more of the storage devices and sets one or more rules and one or more order parameters, and wherein the one or more rules and the one or more order parameters include a trade interest;
analyze the one or more rules and the one or more order parameters to determine eligibility for at least one of the one or more first parties;
determine a first subset of the one or more first parties based on the one or more rules and the one or more order parameters, wherein the first sub-set of the one or more first parties each conform to at least one of the one or more rules or the one or more order parameters;
match the trade interest of the one or more first parties based on the identification of the first subset of the one or more first parties and the one or more rules or the one or more order parameters;
generate and transmit a match message to the first computer system, the match message indicating that a match has been found;
display information based on the match message on at least one first display, wherein the at least one first display is operatively connected to the one or more first computer systems, wherein the information displayed on the one or more first display comprises a first window approximately adjacent a second window, and wherein the first window comprises the trade interest and at least one of a slider interface and a first button for confirming the trade interest, and wherein the second window comprises a second button for withdrawing the trade interest;

receive a reply message input from the one or more first computer systems, wherein the reply message input indicates whether at least one first party confirms the trade interest or whether at least one first party withdraws the trade interest;

transmit a negotiation message to the second computer system confirming the respective trade interests, wherein the transmission of the negotiation message to the second party computer system indicates that trade negotiation can commence; and match the orders of the one or more first parties when the one or more order parameters and the one or more order parameters for a second party include a same instrument symbol and an opposite order direction, when the one or more rules for the first and second party include a mutual second party.

2. The system according to claim 1, wherein the first computer system is a buy-side computer system and the second computer system is a sell-side computer system.

3. The system according to claim 1, wherein the one or more rules includes, for the one or more first parties, an indication of which other first parties, if any, to avoid matching with, and an indication of at least one second party that each first party is willing to engage with for subsequent trade negotiation.

4. The system according to claim 1, wherein the one or more processors are further configured to communicate via the network with the one or more first parties to withdraw, modify, or cancel pending trade interests.

5. The system according to claim 1, wherein the message to the second party includes instrument details and names or identities of the one or more first parties.

6. The system according to claim 1, wherein the one or more first parties include at least two first parties.

7. A method for order matching in the trading of financial instruments using a centralized matching engine having one or more transmitters and receivers, wherein the centralized matching engine is communicatively coupled to a network, the network including one or more first computer systems and at least one second computer system, wherein the one or more first computer systems are configured to communicate between a one or more first parties and the centralized matching engine, wherein the at least one second computer system is configured to communicate between a second party and the centralized matching engine, wherein the centralized matching engine further includes one or more processors operatively coupled to one or more storage devices and the one or more transmitters and receivers, the method comprising:

receiving at least one message sent over the network from any of the one or more first computer systems, wherein the at least one message is stored in one or more of the storage devices and sets one or more rules and the one or more order parameters, and wherein the one or more rules and the one or more order parameters include a trade interest;

analyzing the one or more rules and the one or more order parameters to determine eligibility for at least one of the one or more first parties;

determining a first subset of the one or more first parties based on the one or more rules and the one or more order parameters, wherein the first sub-set of the one or more first parties each conform to at least one of the one or more rules or the one or more order parameters;

matching the trade interest of one or more first parties based on the identification of the first subset of the one or more first parties and the one or more rules or the one or more order parameters;

generating and transmitting a match message to the first computer system, the match message indicating that a match has been found;

displaying information based on the match message on at least one first display, wherein the at least one first display is operatively connected to the one or more first computer systems, wherein the information displayed on the one or more first display comprises a first window approximately adjacent a second window, and wherein the first window comprises the trade interest and at least one of a slider interface and a first button for confirming the trade interest, and wherein the second window comprises a second button for withdrawing the trade interest;

receiving a reply message input from the one or more first computer systems, wherein the reply message input indicates whether at least one first party confirms the trade interest or whether at least one first party withdraws the trade interest;

transmitting a negotiation message to the second computer system confirming the respective trade interests, wherein the transmission of the negotiation message to the second computer system indicates that trade negotiation can commence; and matching the orders of the one or more first parties when the one or more order parameters and the one or more order parameters for a second party include a same instrument symbol and an opposite order direction, when the one or more rules for the first and second party include a mutual second party.

8. The method according to claim 7, wherein the first computer system is a buy-side computer system and the second computer system is a sell-side computer system.

9. The method according to claim 7, wherein the one or more rules includes, for the one or more first parties, an indication of which other first parties, if any, to avoid matching with, and an indication of at least one second party that each first party is willing to engage with for subsequent trade negotiation.

10. The method according to claim 7, further comprising communicating via the network with the one or more first parties to withdraw, modify, or cancel pending trade interests.

11. The method according to claim 7, wherein the message to the second party includes instrument details and names or identities of the one or more first parties.

12. The method according to claim 7, wherein the one or more first parties include at least two first parties.

13. The method according to claim 7, wherein the one or more order parameters comprises one or more of the instrument symbol, an order size, or the order direction for the trade interest placed by the one or more first parties.

14. A non-transitory computer-readable medium storing instructions that, when executed by a processor, cause a computer system to match orders in the trading of financial instruments, by performing the steps of:

receiving at least one message sent over a network from any of one or more first party computer systems, wherein the network includes the one or more first computer systems and at least one second computer system, wherein the one or more first computer systems are configured to communicate between one or more first parties and a centralized computer matching engine, wherein the at least one second computer system is configured to communicate between a second party and the centralized computer matching engine, wherein the at least one message is stored in one or more storage devices coupled to the centralized matching engine and sets one or more rules and one or more order parameters, and wherein the one or more rules and the one or more order parameters include a trade interest;

analyzing the one or more rules and the one or more order parameters to determine eligibility for at least of the one or more first parties;

determining a first subset of the one or more first parties based on the one or more rules and the one or more order parameters, wherein the first sub-set of the one or more first parties each conform to at least one of the one or more rules or the one or more order parameters;

matching the trade interest of one or more first parties based on the identification of the first subset of the one or more first parties and the one or more rules or the one or more order parameters;

generating and transmitting a match message to the first computer system, the match message indicating that a match has been found;

displaying information based on the match message on at least one first display, wherein the at least one first display is operatively connected to the one or more first computer systems;

receiving a reply message input from the one or more first computer systems, wherein the reply message input indicates whether at least one first party confirms the trade interest or whether at least one first party withdraws the trade interest, wherein the information displayed on the one or more first display comprises a first window approximately adjacent a second window, and wherein the first window comprises at least one of a slider interface and the trade interest and a first button for confirming the trade interest, and wherein the second window comprises a second button for withdrawing the trade interest;

transmitting a negotiation message to the second computer system confirming the respective trade interests, wherein the transmission of the negotiation message to the second computer system indicates that trade negotiation can commence; and matching the orders of the one or more first parties when the one or more order parameters and the one or more order parameters for a second party include a same instrument symbol and an opposite order direction, when the one or more rules for the first and second party include a mutual second party.

* * * * *